(12) United States Patent
Schuler et al.

(10) Patent No.: US 9,320,006 B2
(45) Date of Patent: Apr. 19, 2016

(54) CATEGORIZED LOCATION IDENTIFICATION BASED ON HISTORICAL LOCATIONS OF A USER DEVICE

(71) Applicant: T-Mobile USA, Inc., Bellevue, WA (US)

(72) Inventors: Seth H. Schuler, Bellevue, WA (US); Linda Zhao, Bellevue, WA (US); Xianglong Kong, Bellevue, WA (US); Michael J. Goo, Renton, WA (US); Jeffrey M. Giard, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 107 days.

(21) Appl. No.: 13/931,602

(22) Filed: Jun. 28, 2013

(65) Prior Publication Data

US 2015/0004999 A1 Jan. 1, 2015

(51) Int. Cl.
| H04W 24/00 | (2009.01) |
| H04W 64/00 | (2009.01) |
| G01S 5/02  | (2010.01) |

(52) U.S. Cl.
CPC .............. *H04W 64/00* (2013.01); *G01S 5/0278* (2013.01)

(58) Field of Classification Search
CPC ... H04W 4/24; H04M 2215/32; H04M 15/00; H04M 2215/2026
See application file for complete search history.

(56) References Cited

U.S. PATENT DOCUMENTS

| 7,574,661 | B2  |   | 8/2009  | Matsuura et al. |
| 8,498,817 | B1  | * | 7/2013  | Erdmann et al. ............... 701/519 |
| 2009/0268890 | A1 |   | 10/2009 | Gupta |
| 2010/0100463 | A1 |   | 4/2010  | Molotsi et al. |
| 2010/0279708 | A1 | * | 11/2010 | Lidsrom et al. ............ 455/456.1 |
| 2013/0109351 | A1 | * | 5/2013  | Kato ............................. 455/411 |
| 2013/0166352 | A1 | * | 6/2013  | Scarr et al. ................... 705/7.33 |
| 2014/0266698 | A1 | * | 9/2014  | Hall et al. ................ 340/539.13 |

FOREIGN PATENT DOCUMENTS

WO     WO2006135591     12/2006

OTHER PUBLICATIONS

PCT Search Report and Written Opinion mailed Oct. 2, 2014 for PCT application, No. PCT/US14/41934, 11 pages.

* cited by examiner

*Primary Examiner* — Vladimir Magloire
*Assistant Examiner* — Shantell L Heiber
(74) *Attorney, Agent, or Firm* — Lee & Hayes, PLLC

(57) ABSTRACT

Techniques determining a categorized location of a user of a user device based at least in part on a set of location and time pairs for the user device are described herein. The set of location and time pairs for the user device include at least one location and time pair that is associated with a communication of the user device over a communication network. In some embodiments, the techniques further predict a location for the user given a specified time and based at least in part on the set of location and time pairs for the user device.

21 Claims, 4 Drawing Sheets

CATEGORIZED LOCATION IDENTIFICATION BASED ON HISTORICAL LOCATIONS OF A USER DEVICE

BACKGROUND

Providers of communication services, such as telecommunication service providers, have detailed records of their subscribers' wireless activities. This information includes location—when a subscriber uses his or her cell phone and often a billing address for an account. Billing addresses can provide insight into where subscribers live, helping service providers better target and develop services and advertise those services. However, this information is not always an accurate representation of where the device is most often used and is not always available (e.g., for prepaid subscribers).

While lacking direct information specifying meaningful locations for subscribers, such as home or work locations, these service providers may have other information available to them that can be used to derive such locations. For example, when subscribers initiate communications or connect to a network of the service provider, both the cell tower location and a time may be captured.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
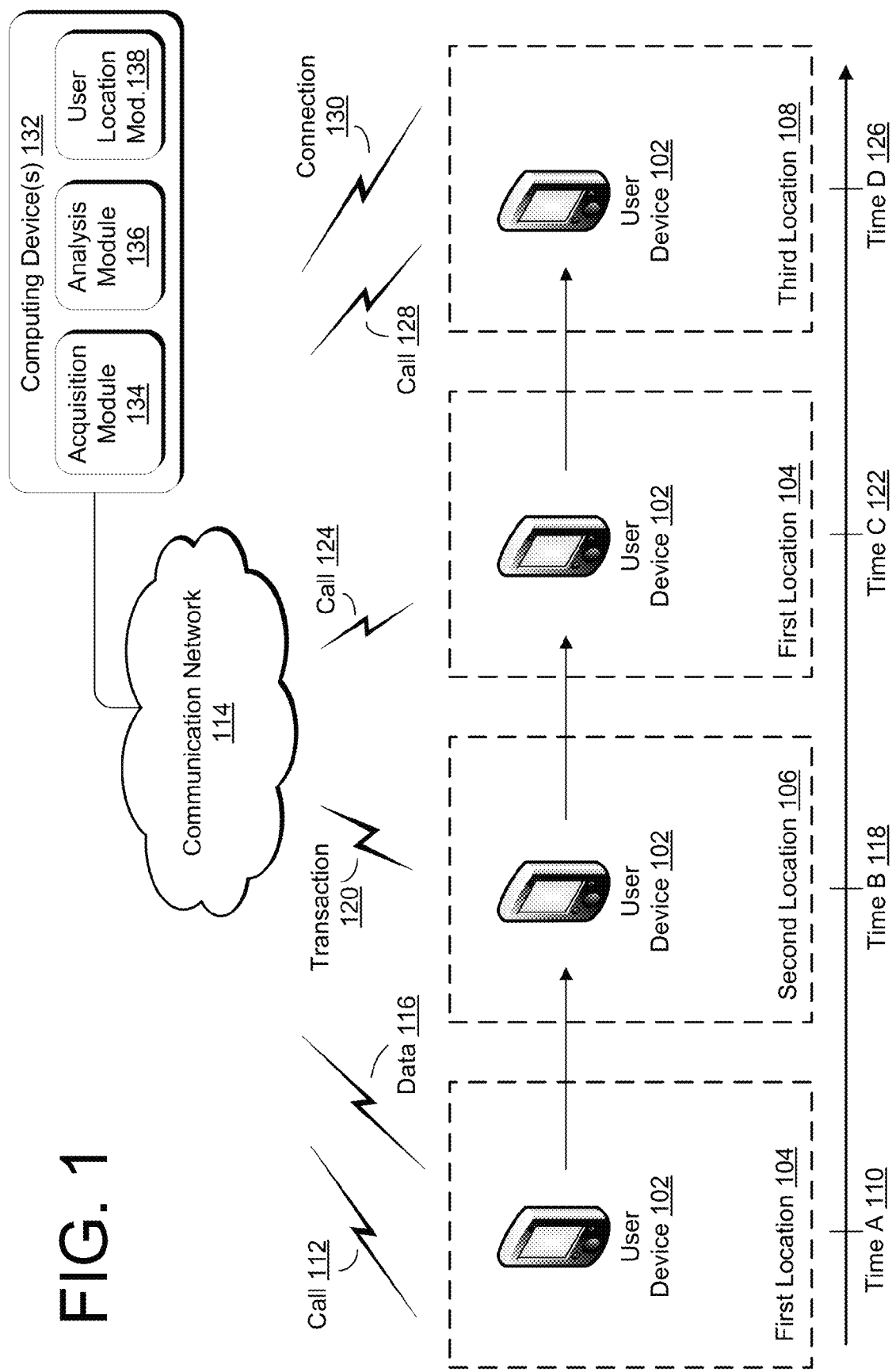
FIG. 1 illustrates an overview of techniques for determining categorized locations for a user of a user device based at least on historical locations and associated times for the user device.

This disclosure describes, in part, techniques for determining categorized locations for a user of a user device based at least on historical locations and associated times for the user device. Examples of categorized locations (also referred to herein, interchangeably, as "meaningful locations") include but are not restricted to day-time and night-time locations during weekdays, which may serve as proxies for work and home locations, as well as travel locations and weekend locations. Any frequently visited location during a predictable time period can be viewed as a categorized location for different use cases.

Over a period of time, a user may engage in a variety of activities at a variety of locations with a user device. Such activities could include voice calls, video calls, messaging, transactions, social networking, and data consumption. The user device may also engage in activities independently of the user, such as connecting to a communication network. Data indicative of these activities, which may include pairs of associated locations and times, may be gathered and stored by a communication network, by the user device, or by another device or server. In some embodiments, the data may form or be a part of a multi-factor identity fingerprint.

A computing device associated with the communication network may receive this data, or at least location-time pairs included in the data, and may determine a categorized location for the user based at least in part on the location-time pairs. For example, the location-time pairs may indicate a number of locations that a user was at during the night-time over a time frame (e.g., last 1-3 months). The computing device may determine counts of the location-time pairs for each of the number of locations and may select one of those locations as a categorized location (e.g., as a home location) based on the counts (e.g., select location with the highest count or average locations with counts exceeding a threshold).

In some embodiments, upon receiving the data, the computing device determines the home network associated with the user device and excludes location-time pairs associated with activities occurring outside of the home network. In such embodiments, the home network acts as a filter, with the computing device assuming that the categorized location is within a geographic area associated with the home network.

In various embodiments, the computing device may also use other data in determining the categorized location of the user. For example, a billing address for the user or address of another subscriber (presumed to be a family member) on a same plan as the user may be known. Such information may be used in combination with the location-time pairs as a filter or as another location to be weighed with the locations of the location-time pairs.

In further embodiments, the computing device may also predict locations for the user at future times based on the location-time pairs. In such embodiments, the computing device may provide a user interface, and a user may specify a time, such as a current or future time. Based on the specified time and the location-time pairs, the computing device may predict a location for the user and may provide the predicted location in response to the query. In some embodiments, such a predicted location may be used in authenticating the identity of the user.

In various embodiments, the determined categorized location may be provided for any of a number of uses. For example, the categorized location may be provided for use in marketing or advertising, for identifying locations for prepaid customers of service provider associated with the communication network, or for use in authenticating the user.

Overview

FIG. 1 illustrates an overview of techniques for determining categorized locations for a user of a user device based at least on historical locations and associated times for the user device. As illustrated, a user device 102 may travel with its user among a number of locations 104-108. At a first location 104 at a time A 110, the user utilizes the user device 102 to make a voice or video call 112 over the communication network 114 and to receive data 116, such as a web page or social networking data, via the communication network 114. At a second location 106 at a time B 118, the user utilizes the user device 102 to engage in a transaction 120 enabled by the communication network 114. Again at first location 104, at time C 122, the user utilizes the user device 102 to make a voice or video call 124 over the communication network 114. At a third location 108 at a time D 126, the user utilizes the user device 102 to make a voice or video call 128 over the communication network 114. Also at the third location 108 at time D 126, the user device 102 connects to the communication network 114 (e.g., to receive a software update). These activities, locations, and timeline are simply provided for the sake of illustration, and any number of other activities may be performed at alternative locations or on an alternate timeline.

The communication network 114 may log data associated with the calls 112, 124, and 128, data transmission 116, transaction 120, connection 130, and any other activities involving the user device 102 and communication network 114. The logged data may include at least identifiers of the locations 104-108 and the times 110, 118, 122, and 126 and may be provided to or retrieved by one or more computing devices 132. The computing device(s) 132 may include at least a data acquisition module 134 to receive or retrieve the logged data from the communication network 114, a data analysis module 136 to determine, based at least on the logged data, a categorized location of the user of the user device 102, and a user location module 138 to provide an indication of the categorized location.

The communication network 114 may be a telecommunication network providing telecommunication services, including data services, to the user device 102 and to a plurality of other devices of other users. The communication network 114 may be or include a public or private packet switched network, such as the Internet, circuit switched network, or combination of packet switched and circuit switched networks. The communication network 114 may include a plurality of computing devices, such as base stations and core network components, connected, for example, by one or more wide area networks (WAN), one or more local area networks (LAN), and/or one or more personal area networks (PAN). Communication between these ones of these computing devices of the communication network 114 may be wired, wireless, or both. These communications may utilize any sort of communication protocol known in the art for sending and receiving messages, such as the Transmission Control Protocol/Internet Protocol (TCP/IP), the Hypertext Transfer Protocol (HTTP), Extensible Messaging and Presence Protocol (XMPP), and/or the Session Initiation Protocol (SIP). Any one or more of these protocols may also be used to communicate with user devices 102 through base stations or other access points and to further communicate with one or more other networks.

At base stations or other core network components, the communication network 114 may log data associated with the calls 112, 124, and 128, data transmission 116, transaction 120, connection 130, and any other activities involving the user device 102. Such logged data may comprise voice call records, video call records, or other records storing location and time pairs associated with the activities. For example, the records may be associated with connections to the communication network 114 through wireless networks, data connections through base stations of the communication network 114, transactions utilizing the user device 102 to transmit payment or identify the user, text or video message transmissions, or social networking activity. In some embodiments, a device or devices associated with the communication network 114 may form the logged data into multi-factor identity fingerprints. Such identity fingerprints are discussed below in detail with regard to FIG. 2.

The computing device(s) 132 may be implemented as any one or more computing devices, such as personal computers (PCs), laptop computers, workstations, server systems, mainframes, server farms, or any other computing devices. Also, modules and data of the computing device(s) 132 may be implemented in a single computing device or distributed among multiple computing devices. An example of such a computing device 132 is illustrated in greater detail in FIG. 2 and is described in detail below with reference to that figure.

In some embodiments, the data acquisition module 134 is configured to receive or retrieve location and time pairs from the communication network 114. The location and time pairs may be included in logged data or multi-factory identity fingerprints derived from the logged data. The data acquisition module 134 may retrieve the logged data and identity fingerprints, or may simply retrieve the location and time pairs from that logged data and those identity fingerprints.

In various embodiments, the data analysis module 136 is configured to perform at least one of determining a categorized location for a user of a user device 102 or predicting a location for the user of the user device 102. The data analysis module 136 may determine the categorized location based at least in part on the location and time pairs included in the logged data, and may also consider other data, such as billings addresses, information known about family members of the user, etc. The data analysis module 136 may also predict the location of the user at a future time based at least in part on the location and time pairs included in the logged data. The future time may, in some embodiments, be specified in a request received at a user interface offered by the computing device(s) 132.

In some embodiments, the user location module 138 may simply provide a categorized location or predicted location in response to a request or a query. In some embodiments, the user location module 138 may also provide a user interface or be associated with a user interface provided by another module.

The modules 134-138 are described in greater detail below with reference to FIG. 2.

Example Device

Figure 2:
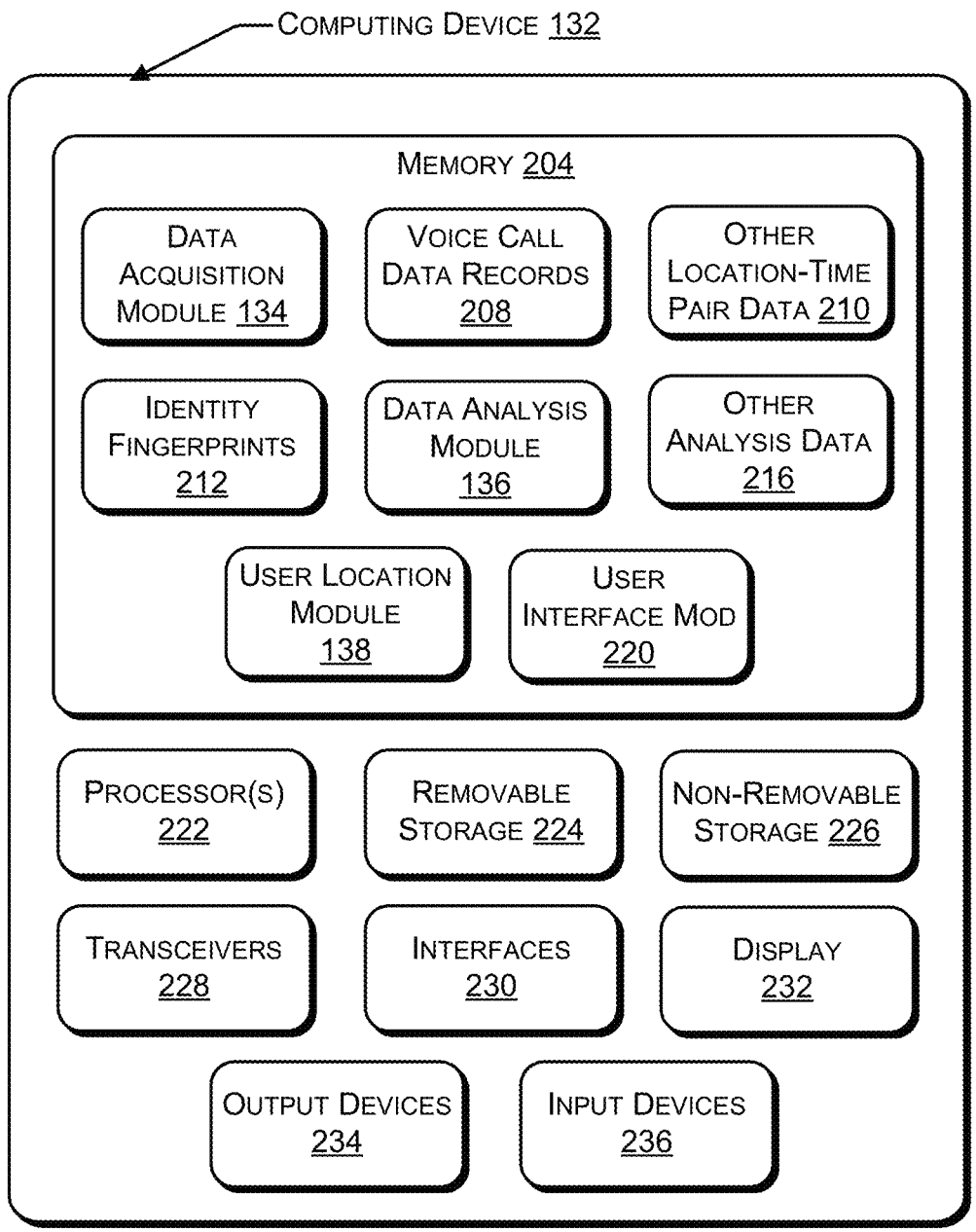
FIG. 2 illustrates an example computing device configured to determine categorized locations for a user of a user device.

FIG. 2 illustrates an example computing device configured to determine categorized locations for a user of a user device. As illustrated, the computing device 132 comprises a system memory 204 storing a data acquisition module 134, voice call data records 208, other location-time pair data 210, identity fingerprints 212, a data analysis module 136, other analysis data 216, a user location module 138, and a user interface module 220. Also, the computing device 132 includes processor(s) 222, a removable storage 224, a non-removable storage 226, transceivers 228, interfaces 230, a display 232, output device(s) 234, and input device(s) 236.

In various embodiments, system memory 204 is volatile (such as RAM), non-volatile (such as ROM, flash memory, etc.) or some combination of the two. As mentioned, the system memory 204 may store a data acquisition module 134 that is configured to receive or retrieve location and time pairs from the communication network 114. Such location and time pairs may be included in voice call data records 208 or in other records including location-time pair data 210. Also, the location and time pairs may be included in multi-factory identity fingerprints 212 derived from the logged data. The data acquisition module 134 may retrieve the voice call data records 208, other location-time pair data 210, and identity fingerprints 212 from any device of the communication network 114, such as a base station or a core network component. Also or instead, the voice call data records 208, other location-time pair data 210, and identity fingerprints 212 may be retrieved from user devices 102 or other devices connected to the communication network 114. Upon retrieving the voice call data records 208, other location-time pair data 210, identity fingerprints 212, the data acquisition module 134 may store the voice call data records 208, other location-time pair data 210, and identity fingerprints 212 in the system memory 204.

The voice call data records 208 may be any sort of voice call data records and may include information such as identifiers of calling or called parties, identifiers of base stations servicing the calling or called parties, locations of those base stations servicing the calling and called parties, a time at which the voice call was initiated, and a duration of the voice call.

The other location-time pair data 210 may be records associated with connections to the communication network 114 through wireless networks, data connections through base stations of the communication network 114, transactions utilizing the user device 102 to transmit payment or identify the user, video call data records, text or video message transmissions, or social networking activity.

The multi-factor identity fingerprints 212 may be data structures or other programmatic structures, classes or functions constructed by the communication network 114 or another device constructed from data indicative of user locations and behaviors over time. Each multi-factor identity fingerprint 212 includes a set of data, a plurality of modes, each mode specifying a subset of the set of data that is exposed for querying, and a mode selector operable to select one of the plurality of modes. Multi-factor identity fingerprints 212 are described in greater detail in U.S. application Ser. No. 13/612,755, entitled "Multi-Factor Profile and Security Fingerprint Analysis" and filed on Sep. 12, 2012. U.S. application Ser. No. 13/612,755 is hereby fully incorporated herein by this reference.

In various embodiments, the system memory 204 also stores the data analysis module 136, which may determine categorized locations for users based at least in part on location and time pairs for the user. The data analysis module 136 may determine the categorized locations periodically, or as data 208-212 is received, or in response to requests.

Before determining a categorized location for a user of a user device 102, the data analysis module 136 may filter the location and time pairs for the user device 102. For example, the data analysis module 136 may select location and time pairs associated with one time period (e.g., one month) or may select separately sets of location and time pairs associated with multiple historical time periods (e.g., one month and three months). When selecting multiple sets, one for each time period, the data analysis module 136 may determine a categorized location for each set/time period. The data analysis module 136 may also exclude location and time pairs associated with activities that occurred outside of a home market of the user. The data analysis module 136 may determine that a market is a home market by counting the number of location and time pairs associated with activities in that market, counting a total number of location and time pairs, dividing the per-market count by the total count, and determining if the result exceeds a threshold (e.g., thirty percent).

Once the data analysis module 136 has determined the set of location and time pairs to use in determining the categorized location, the data analysis module 136 may cluster the location and time pairs by location. The location in each location and time pair may be defined by a latitude and longitude, and the data analysis module 136 may cluster all location and time pairs whose intersections of latitude and longitude fall within a geographic area.

The data analysis module 136 may then determine counts of location and time pairs in each cluster that fall within a timeframe. For example, a given cluster may have a total count of twenty, and of those twenty, eight location and time pairs may fall within a daily timeframe of eight p.m. to six a.m.

In some embodiments, the data analysis module 136 may then simply select the cluster with the highest count of location and time pairs falling within the time frame and set one of the categorized location to the location associated with that cluster. For example, if the time frame is eight p.m. to six a.m., the location of the highest count cluster may be a categorized location such as a home location. If a daytime timeframe is used, the location may be regarded as the work location. In other embodiments, depending on usage patterns or other information, the home and work locations may be flipped.

In further embodiments, rather than simply selecting the highest count, the data analysis module 136 may determine the count of location and time pairs for a cluster that fall within a timeframe, determine a total count of location and time pairs that fall within the timeframe, divide the per-cluster count by the total count, and compare the result to a threshold (e.g., twenty-five percent). Each cluster associated with a result exceeding the threshold may be regarded as a primary cluster. Primary clusters may then be ranked, with the highest ranked selected and its associated location selected as the categorized location. Alternatively, the locations of the primary clusters may used to calculate a mean location, and the mean location may be selected as the categorized location. In some embodiments, such a calculation may involve giving different weights to different ones of the primary clusters based on their rank.

In various embodiments the data analysis module 136 may utilize other analysis data 216 in determining the categorized location for the user. Such other analysis data may include the user's billing address, billing addresses of other users sharing a communication service account with the user, or usage patterns for the user device at different locations. For example, the data analysis module 136 may determine that a first location is a home location and that a second location is a work location based on the location and time pairs. The billing address or usage pattern may indicate the reverse, however: that the second location is the home location. This may be because the user works nights. The data analysis module 136 may then flip the home location and work location based on the other analysis data.

The data analysis module 136 may also be configured to predict a location for a user, given a specified time and a set of location and time pairs for the user device 102 of the user. For example, the data analysis module 136 may determine the location in the location and time pairs that the user device 102 was at most frequently at the time of day corresponding to the specified time. In some embodiments, the data analysis module 136 may filter out locations that are outside of the user's home market or which are disqualified for some other reason.

In some embodiments, the system memory 204 further stores a user location module 138 configured to provide an identifier of the user device 102 along with the determined categorized location. Additionally or alternatively, the user location module 138 may be configured to provide a predicted location for a user at a specified time. The categorized location or predicted location may be used in marketing or advertising, for identifying locations for customers of service provider without billing addresses associated with the communication network 114, or for authenticating the user. The categorized location or predicted location may be provided to another program through a programmatic interface or may be provided by a user interface for viewing, such as a user interface provided by a user interface module 220. The categorized location or predicted location may also be provided by the user location module 138 either automatically or responsive to a request.

In further embodiments, the system memory 204 stores a user interface module 220 to provide a user interface that enables requesting of categorized locations or predicted locations for a user. Through the user interface, for example, a user may specify an individual or device of an individual, as well as a time, and may receive a location prediction for the individual for the specified time. In another example, the user interface may enable a user to specify a market (e.g., New York City) and get a count in return of users with categorized locations in that market. Returned information may be specified as text or with charts and other graphics.

In some embodiments, the processor(s) 222 is a central processing unit (CPU), a graphics processing unit (GPU), or both CPU and GPU, or any other sort of processing unit.

Computing device 132 also includes additional data storage devices (removable and/or non-removable) such as, for example, magnetic disks, optical disks, or tape. Such additional storage is illustrated in FIG. 2 by removable storage 224 and non-removable storage 226. Tangible computer-readable media may include volatile and nonvolatile, removable and non-removable media implemented in any method or technology for storage of information, such as computer readable instructions, data structures, program modules, or other data. System memory 204, removable storage 224 and non-removable storage 226 are all examples of computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device 132. Any such tangible computer-readable media may be part of the computing device 132.

In some embodiments, the transceivers 228 include any sort of transceivers known in the art. For example, transceivers 228 may include a radio transceiver that performs, in conjunction with an interface 230, the function of transmitting and receiving communications via an antenna. In various embodiments, the interfaces 230 are any sort of interfaces. Interfaces 230 may include a wired interface, such as an Ethernet interface, for wired network communications. Interfaces 230 may also or instead include any one or more of a wireless LAN interface, or a near field interface.

In various embodiments, the display 232 is a liquid crystal display or any other type of display commonly used with computing devices. For example, display 232 may be a touch-sensitive display screen, and can then also act as an input device or keypad, such as for providing a soft-key keyboard, navigation buttons, or the like.

In some embodiments, the output devices 234 include any sort of output devices known in the art, such as a display (already described as display 232), speakers, a vibrating mechanism, or a tactile feedback mechanism. Output devices 234 also include ports for one or more peripheral devices, such as headphones, peripheral speakers, or a peripheral display.

In various embodiments, input devices 236 include any sort of input devices known in the art. For example, input devices 236 may include a camera, a microphone, a keyboard/keypad, or a touch-sensitive display (such as the touch-sensitive display screen described above). A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Example Processes

Figure 3:
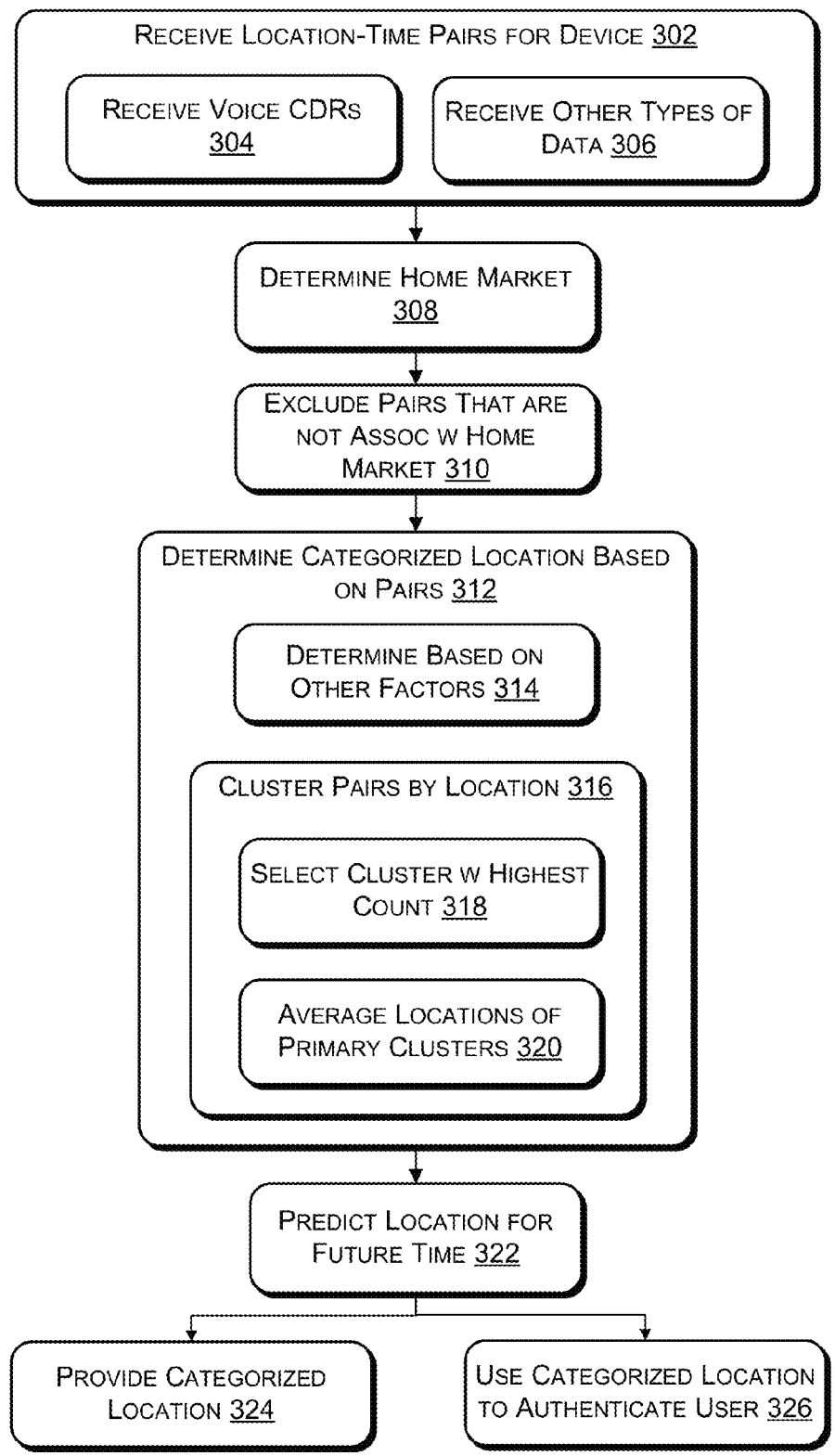
FIG. 3 illustrates an example process for determining a categorized location of a user of a user device based at least on historical location-time pairs for the user device.
Figure 4:
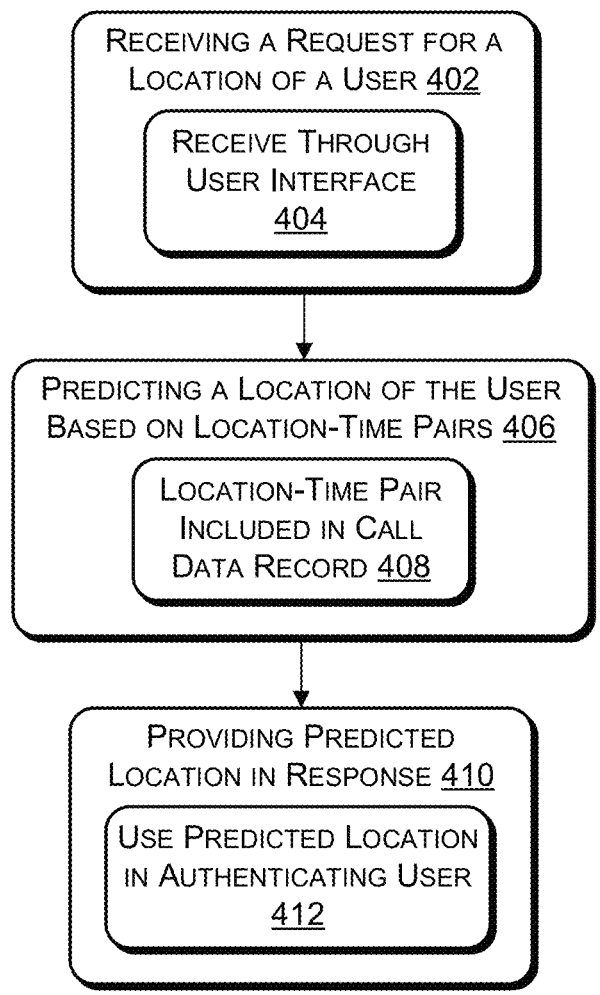
FIG. 4 illustrates an example process for predicting a location of a user device at a given time based at least on historical location-time pairs for the user device.

FIGS. 3-4 illustrate example processes. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 3 illustrates an example process for determining a categorized location of a user of a user device based at least on historical location-time pairs for the user device. The process includes, at 302, a computing device receiving a set of location and time pairs for a user device, at least one of the location and time pairs being associated with a communication of the user device over a communication network. In some embodiments, the set of location and time pairs is part of a multi-factor identity fingerprint for the user, the multi-factor identity fingerprint being constructed from data indicative of user locations and behaviors over time. The multi-factor identity fingerprint may include a set of data, a plurality of modes, each mode specifying a subset of the set of data that is exposed for querying, and a mode selector operable to select one of the plurality of modes. In further embodiments, the set of location and time pairs includes multiple subsets of location and time pairs that are respectively associated with different historical time periods, and the determining comprises determining a categorized location for each historical time period. At 304, at least one of the location and time pairs is associated with a voice call data record. At 306, some of the location and time pairs are associated with connections to the communication network through wireless networks, data connections through base stations of the communication network, transactions utilizing the user device to transmit payment or identify a user, video call data records, text or video message transmissions, or social networking activity.

At 308, the computing device determines that a market is a home market based at least in part on whether a count of communications of the user device in the market divided by a total count of communications of the user device exceeds a threshold.

At 310, the computing device excludes from the set of location and time pairs a location and time pair that is associated with a communication engaged in by the user device outside of the home market of the user or a location and time pair that is associated with a communication engaged in by the user device that is not associated with market information.

At 312, the computing device determines a categorized location of the user of the user device based at least in part on the set of location and time pairs. At 314, the determining further comprises determining the categorized location based on the user's billing address, addresses of other users sharing a communication service account with the user, or usage patterns for the user device at different locations.

At 316, the computing device clusters the location and time pairs into different clusters based on latitude and longitude and counts for each cluster, location and time pairs within that cluster that are associated with communications of the user device which occur during a daily time frame. At 318, the computing device determines the cluster with the highest count of location and time pairs that are associated with communications of the user device which occur during the daily time frame and selects a location associated with the cluster having the highest count as the determined categorized location. Alternatively to 318, at 320, the computing device computes, for each cluster, a ratio of the count of time and location pairs for that cluster to a total number of time and location pairs, determines one or more clusters for which the ratio exceeds a threshold, and determines the categorized location by averaging locations associated with the determined one or more clusters.

At 322, the computing device predicts a location of the user device for a future time based at least in part on the set of location and time pairs.

At 324, the computing device provides the categorized location for use in marketing, advertising, or for identifying locations for customers of service provider associated with the communication network.

At 326 the computing device provides the categorized location for use in authenticating the user.

FIG. 4 illustrates an example process for predicting a location of a user device at a given time based at least on historical location-time pairs for the user device. The process includes, at 402, a computing device receiving a request for a location of a user, the request specifying a time. At 404, the request may be received through a user interface for requesting location predictions.

At 406, the computing device predicts a location for the user based at least in part on the time and on a set of location and time pairs for a user device of the user. At least one of the location and time pairs may be associated with a communication of the user device over a communication network. At 408, at least one of the location and time pairs is associated with a voice call data record.

At 410, the computing device provides the predicted location of the user in response to the request. At 412, the predicted location may then be used in authenticating the user.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more processors;
a data acquisition module configured to be operated by the one or more processors to receive voice call data records for a user device, each voice call data record including a location and time pair;
a data analysis module configured to be operated by the one or more processors to determine an area as a home market location based at least in part on whether a count of communications of the user device in the area divided by a total count of communications of the user device exceeds a threshold and determine a categorized location of a user of the user device based at least in part on location and time pairs included in the voice call data records and the home market location, wherein the location and time pairs not associated with the home market location are excluded from the determining the categorized location; and
a user location module configured to be operated by the one or more processors to provide an identifier of the user device along with the determined categorized location.

2. The system of claim 1, further comprising a user interface module to receive a request for a prediction of a location of the user, wherein the data analysis module is further to predict the location based at least in part on the location and time pairs included in the voice call data records, and the user location module is to provide the predicted location in response to the request.

3. The system of claim 1, wherein the data acquisition module is further to receive location and time pairs associated with connections to a communication network through wireless networks, data connections through base stations of the communication network, transactions utilizing the user device to transmit payment or identify the user, video call data records, text or video message transmissions, or social networking activity.

4. A computer-implemented method comprising:
receiving a set of location and time pairs for a user device, at least one of the location and time pairs being associated with a communication of the user device over a communication network;
determining an area as a home market location based at least in part on whether a count of communications of the user device in the area divided by a total count of communications of the user device exceeds a threshold; and
determining a categorized location of a user of the user device based at least in part on the set of location and time pairs, wherein the location and time pairs not associated with the home market location are excluded from the determining the categorized location.

5. The method of claim 4, wherein the at least one of the location and time pairs is associated with a voice call data record.

6. The method of claim 4, wherein some of the location and time pairs are associated with connections to the communication network through wireless networks, data connections through base stations of the communication network, transactions utilizing the user device to transmit payment or identify the user, video call data records, text or video message transmissions, or social networking activity.

7. The method of claim 4, wherein the determining further comprises determining the categorized location based on the user's billing address, addresses of other users sharing a communication service account with the user, or usage patterns for the user device at different locations.

8. The method of claim 4, wherein the set of location and time pairs is part of a multi-factor identity fingerprint for the user, the multi-factor identity fingerprint being constructed from data indicative of user locations and behaviors over time.

9. The method of claim 8, wherein the multi-factor identity fingerprint includes a set of data, a plurality of modes, each mode specifying a subset of the set of data that is exposed for querying, and a mode selector operable to select one of the plurality of modes.

10. The method of claim 4, wherein the set of location and time pairs includes multiple subsets of location and time pairs that are respectively associated with different historical time periods, and the determining comprises determining a categorized location for each historical time period.

11. The method of claim 4, wherein the locations in the set of location and time pairs each comprise a latitude and longitude, and the method further comprises clustering the location and time pairs into different clusters based on latitude and longitude.

12. The method of claim 11, further comprising, for each cluster, counting location and time pairs within that cluster that are associated with communications of the user device which occur during a daily time frame.

13. The method of claim 12, further comprising:
determining the cluster with the highest count of location and time pairs that are associated with communications of the user device which occur during the daily time frame; and
selecting a location associated with the cluster having the highest count as the determined categorized location.

14. The method of claim 12, further comprising:
computing, for each cluster, a ratio of the count of location and time pairs for that cluster to a total number of location and time pairs;
determining one or more clusters for which the ratio exceeds a threshold; and
determining the categorized location by averaging locations associated with the determined one or more clusters.

15. The method of claim 4, further comprising predicting a location of the user device for a future time based at least in part on the set of location and time pairs.

16. The method of claim 4, further comprising providing the categorized location for use in marketing, advertising, or for identifying locations for pre-paid customers of service provider associated with the communication network.

17. The method of claim 4, further comprising providing the categorized location for use in authenticating the user.

18. The method of claim 4, further comprising providing an identifier of the user device along with the determined categorized location.

19. One or more non-transitory computer-readable media storing computer-executable instructions that, when executed by one or more computing devices, cause the one or more computing devices to perform operations comprising:
receiving a request for a location of a user, the request specifying a time;
based at least in part on the time and on a set of location and time pairs for a user device of the user, predicting the location of the user, wherein at least one of the location and time pairs is associated with a communication of the user device over a communication network and a home market area previously determined based on whether a count of communications of the user device in the home market area divided by a total count of communications of the user device exceeds a threshold, wherein the location and time pairs not associated with the home market area are excluded from the predicting the location of the user; and
providing the predicted location of the user in response to the request.

20. The one or more non-transitory computer-readable media of claim 19, wherein the providing comprises providing the predicted location for use in authenticating the user.

21. The one or more non-transitory computer-readable media of claim 19, wherein the at least one of the location and time pairs is associated with a voice call data record.

* * * * *